United States Patent [19]

Nagaoka et al.

[11] Patent Number: 4,673,274
[45] Date of Patent: Jun. 16, 1987

[54] AUTOMATIC FOCUSING APPARATUS FOR CAMERA

[75] Inventors: Yoshitomi Nagaoka, Neyagawa; Yoshiteru Matsuda, Sakurai; Yoshiaki Hirao, Habikino; Ryuichiro Kuga, Katano; Hiroyuki Asakura, Osaka, all of Japan

[73] Assignee: Matsushita Electric Industrial Co., Ltd., Kadoma, Japan

[21] Appl. No.: 776,031

[22] Filed: Sep. 13, 1985

[30] Foreign Application Priority Data

Sep. 18, 1984 [JP] Japan .................. 59-195010
Sep. 18, 1984 [JP] Japan .................. 59-195011

[51] Int. Cl.⁴ .............................. G03B 3/10
[52] U.S. Cl. ................................. 354/403
[58] Field of Search ...................... 354/403

[56] References Cited

U.S. PATENT DOCUMENTS

4,573,783  3/1986  Maruyama .................. 354/403

Primary Examiner—Michael L. Gellner
Attorney, Agent, or Firm—Wenderoth, Lind & Ponack

[57] ABSTRACT

An automatic focusing system for a camera includes a light emitter for emitting a distance measuring light beam and a condenser lens for condensing the light beam reflected by an object. A light spot detector produces output signals corresponding to the position of the focused spot of reflected light impinging thereon. Various circuitry, including adders and subtracters and amplifiers and rectifiers and integrators are provided for processing the output signals of the light spot detector. A lens encoder detects the existing focusing position of a picture taking lens and further circuitry is provided for comparing the existing focusing position of the picture taking lens with a desired optimum focusing position and for driving the lens by a lens driving unit so as to move the lens to its optimum focusing position.

19 Claims, 11 Drawing Figures

AUTOMATIC FOCUSING APPARATUS FOR CAMERA

BACKGROUND OF THE INVENTION

1. Field of the Invention

The present invention relates to an automatic focusing apparatus for focusing the lens of a camera so that the image of an object to be taken is focused accurately at a predetermined position.

2. Description of the Prior Art

Various automatic focusing systems for a camera have been proposed and applied to practical still cameras. Recently, applications of the automatic focusing system have been spreading in the field of video cameras.

Among those automatic focusing systems, an active automatic focusing system is a promising one. The active automatic focusing system projects a range finding signal, such as an infrared signal or an ultrasonic signal, against an object to be taken (referred to simply an "object" hereinafter), then receives the reflected range finding signal reflected by the object, and then drives the picture taking lens system to a correct focusing position according to the range finding signal.

Figure 1:
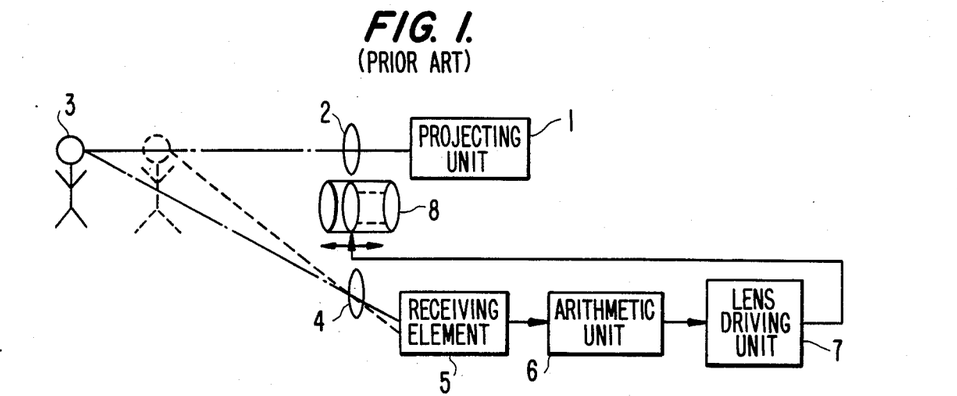
FIG. 1 is a block diagram for explaining the principle of an active automatic focusing system.

FIG. 1 shows the principle of an active automatic focusing system employing infrared rays as a range finding signal. Referring to FIG. 1, an infrared range finding signal projected by a projecting unit 1 travels through a condenser lens 2 and falls on an object 3 and is reflected by the object 3. Then, the reflected infrared range finding signal travels through a condenser lens 4 and falls on a light receiving element 5. The angle of incidence or the point of incidence of the reflected infrared range finding signal on the light receiving element 5 varies according to the variation of the distance between the object 3 and the projecting unit 1 and the distance between the object 3 and the light receiving element 5. An arithmetic unit 6 executes a predetermined operation according to the angle of incidence or the position of incidence of the reflected infrared range finding signal. A lens driving uit 7 drives a picture taking lens system 8 comprising a plurality of component lenses according to the result of the operation to an appropriate focusing position to complete the focusing operation.

Figure 2:
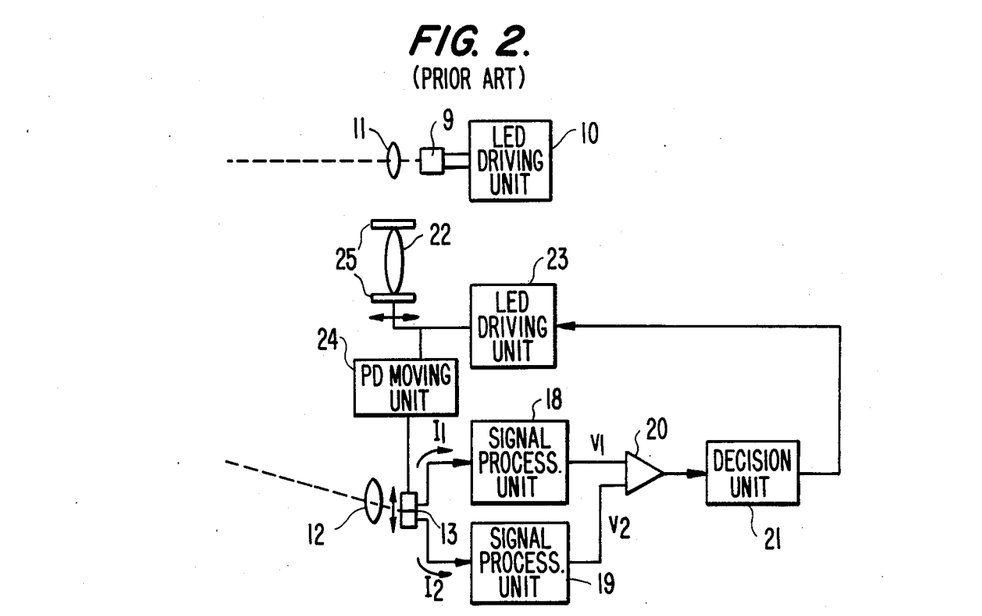
FIG. 2 is a block diagram for explaining the basic principle of a conventional active automatic focusing system.
Figure 3A:
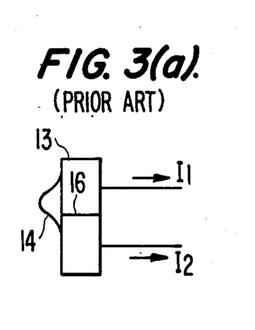
FIGS. 3(a), 3(b) and 3(c) are typical illustrations for ance in explaining the operating principle of a two-part photodiode.
Figure 3B:
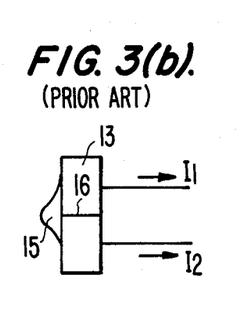
Figure 3C:
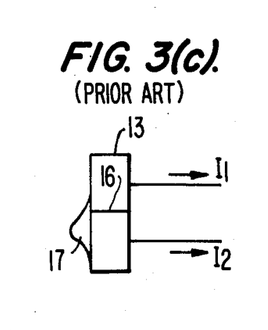

FIG. 2 is a conceptional illustration of a conventional active automatic focusing system employing infrared rays as a range finding signal. A light emitting diode 9 which emits infrared rays (referred to as "infrared LED" hereinafter) is driven by a LED driving unit 10 so as to project range finding infrared rays modulated in a fixed frequency or intermittent range finding infrared rays to discriminate the range finding infrared rays from the ambient infrared rays. The range finding infrared rays travel through a condenser lens 11 and are reflected by an object, not shown. The reflected range finding infrared rays travel through a condenser lens 12 and are focused on a light spot on the surface of a photodiode 13 divided into two parts (referred to as "two-part PD" hereinafter). The two-part PD provides currents $I_1$ and $I_2$ corresponding to the position of the light spot on the surface of the two-part PD. That is, if the center of a light spot 14 is located above the partition line 16 of the two-part PD 13 as shown in FIG. 3(a), $$I_1 > I_2 \tag{1}$$

if the center of a light spot 15 coincides with the partition line 16, as shown in FIG. 3(b), $$I_1 = I_2 \tag{2}$$

and if the center of a light spot 17 is located below the partition line 16 as shown in FIG. 3(c), $$I_1 < I_2 \tag{3}$$

Referring again to FIG. 2, first and second signal processing units 18 and 19 converts the photoelectric currents $I_1$ and $I_2$ produced by the two-part PD 13 into voltages $V_1$ and $V_2$ which are proportional to the photocurrents $I_1$ and $I_2$, respectively. A comparator 20 compares the voltages $V_1$ and $V_2$. A decision unit 21 controls a lens driving unit 23 according to the output of the comparator 20 to move a focusing mechanism 25 for focusing a picture taking lens 22 (represented typically by a single convex lens) frontward or rearward. A photodiode moving unit 24 interlaced with the focusing mechanism 25 moves the two-part PD in either one of the directions indicated by arrows in FIG. 2 as the focusing mechanism 25 operates. The operation of the focusing mechanism 25 is stopped when the two-part PD arrives at a position where the photoelectric currents $I_1$ and $I_2$ are equal to each other. Thus the automatic focusing operation is achieved. In this conventional active automatic focusing system, the setting position and the mechanical displacement of the two-part PD 13 are adjusted beforehand so that the position of the focusing lens group of the picture taking lens and the position of the two-part PD are in one-to-one correspondence.

Accordingly, the decision unit 21 controls the direction of movement of the picture taking lens 22 so that the output photoelectric currents $I_1$ and $I_2$ of the two-part PD will become equal to each other and stops the picture taking lens at an appropriate focusing position to achieve automatic focusing.

This conventional active automaic focusing system has strong points that the range finding accuracy is influenced scarcely by the subject brightness and the subject contrast and that the employment of the infrared LED enables the directional angle to be reduced to a comparatively small angle. Thus the conventional active automatic focusing system is useful.

However, a video camera, in particular, is required to take a continuously moving object in addition to a stationary object. Therefore, the conventional active automatic focusing system needs to project infrared rays continuously while the picture taking lens is being moved to an appropriate focusing position, and hence the operation of the active automatic focusing system requires large power consumption when the object moves over a wide range (for example, changing the object from a near object to a distance object takes several seconds). Ordinarily, the active automatic focusing system continuously requires an electric current as high as 100 to 300 mA during the focusing operation, which is a significant problem with a focusing system for a portable video camera which is operated by power supplied from a battery unit. Furthermore, since the photodiode moving unit needs to be coupled with the picture taking lens focusing mechanism, the disposition of the photodiode is restricted, and hence many restrictions are placed on the design of the mechanism of the picture taking lens.

The dynamic range of signals to be processed by an active automatic focusing system will be examined hereunder. Generally, the quantity of light that enters the photodetector is proportional to the quantity of light emitted by the infrared LED, proportional to the infrared reflectivity of the object and inversely proportional to the square of the distance L between the object and the photodetector. If the infrared reflectivity is 10 to 100% and the range of distance measurement is 1 to 20 m, the dynamic range of the signal to be processed is as wide as 1:4000. Accordingly, the performance of the active automatic focusing system is dependent on the SN ratios (signal-to-noise ratios) of the photodetector and the initial amplifier and the linearlity of the signal processing system over such a wide dynamic range against the scatter of the circuit elements in quantity, temperature variation and DC offset. However, such a conventional active automatic focusing system is unable to achieve distance measurement at a satisfactory accuracy.

SUMMARY OF THE INVENTION

It is an object of the present invention to realize an automatic focusing system for a camera, having a performance to achieve highly accurate distance measurement and capable of enabling the disposition of a distance measuring light projecting unit and a distance measuring light receiving unit without placing any serious restriction on the design of the picture taking lens mechanism of the camera.

To achieve the above object, the system of the present invention comprises: an arithmetic unit which treats of computation with two output signals of an light-spot detector, involving addition and subtraction; a first variable gain amplifier which amplifies an output signal representing the result of addition among the output signals of the arithmetic unit in response to a first control signal; a second variable gain amplifier which amplifies an output signal representing the result of subtraction among the output signals of the arithmetic unit in response to the first control signal; first and second rectifying units which rectify the respective output signals of the first and second variable gain amplifiers, respectively; first and second integrating units which receive the respective output signals of the first and second rectifying units and provide voltage intervals corresponding to the output signals of the first and second rectifying units, respectively; a level deciding unit which decides the level of the output signal of the first integrating unit; a lens encoder which detects the existing focal position of a picture taking lens; a comparator which compares the output signal of the second integrating unit and the output signal of the lens encoder; and an error detecting unit which receives a changeover signal and the output signal of the first rectifying unit and provides a second control signal for controlling the quantity of light of a distance measuring light beam to be emitted by a light emitting unit and the first control signal for controlling the gains of the first and second variable gain amplifiers, wherein the picture taking lens is driven until the value of the output signal of the lens encoder reaches a value corresponding to the value of the output signal of the second integrating unit at the moment when a decision is made by the level deciding unit that the value of the output signal of the first integrating unit reaches a fixed value.

Thus the present invention provides a highly accurate automatic focusing system.

Essential points of the present invention will be described hereinafter.

First, the computation with photoelectric currents $I_1$ and $I_2$ provided by the light-spot detector involving addition and subtraction is implemented in the initial stage the focusing operation, which is an advantageous signal processing constitution in respect of the gain variations of the $I_1$ system and the $I_2$ system. In a conventional constitution, signals are processed through an IC amplifier, a BPF (band-pass filter), a rectifier and the like before arithmetic operation. Consequently, the gain variations of the blocks are superposed and, totally, the gain variation of the $I_1$ system and the $I_2$ system becomes large, which deteriorates the accuracy of distance measurement. According to the present invention, the factors of mismatching of the gain between the $I_1$ system and the $I_2$ system are limited to the factors of the arithmetic unit which operates in the initial stage of the control operation, and hence the above-mentioned problem can be solved satisfactorily. Furthermore, since the conventional system implements the arithmetic operation of DC signals after rectification, the variation of a DC operating point results necessarily from the superposition of offset voltage components, and thereby the accuracy of distance measurement is deteriorated. According to the present invention, AC signals are subjected to arithmetic operations, and hence any one of the above-mentioned problems does not occur.

Secondly, the margins of the integrating units for offset voltage at the input stage are increased greatly by compressing the dynamic range of the signals applied to the first and second integrating units. The present invention employs a function of automatically regulating the luminous flux density of the infrared LED in addition to the automatic gain regulating functions of the variable gain amplifiers, to compress the signal range so that the margins of the integrating units for the offset are increased. The automatic regulation of the luminous flux density is based on a conception that, in measuring the range of a near object, in general, a large quantity of light can be received and the SN ratio is sufficiently large, and hence any practical problem occurs scarcely in the distance measuring performance even if the luminous flux density is reduced. The automatic gain regulation and the automatic luminous flux density regulation are employed in combination as means to compress the dynamic range of signals, namely, means of automatic regulation to maintain constant the value of the output signal $U_+$ of the detecting unit regardless of the variation of the quantity of light received.

The automatic luminous flux density control is executed to compress the dynamic signal range mainly when the quantity of light received is large, while the automatic gain regulation is executed to compress the dynamic signal range mainly when the quantity of light received is small. As apparent from the foregoing description, the employment of the combination of two automatic regulating functions easily realizes the compression of the dynamic signal range of practically 40 dB or above. Thus the margins of the integrating units for an allowable offset can be expanded remarkably.

Thus, according to the present invention, since the two output currents of the light-spot detector is subjected to arithmetic operation at the initial stage of the control operation, errors in the distance measurement attributable to the variations of the circuit elements in quality can be reduced significantly, and the compression of the dynamic signal range through the automatic luminous flux density regulation and the automatic gain regulation improves the reliability of the integral and provides a highly accurate distance measurement signal, which provides a camera with an accurate automatic focus adjusting function.

DESCRIPTION OF THE PREFERRED EMBODIMENT

A preferred embodiment of the present invention will be described hereinafter in connection with the accompanying drawings.

The constitution of the present invention is based on the principle of triangulation with infrared rays. First the constitution of an arithmetic unit, namely, an essential component of the present invention, will be described in connection with FIG. 4.

Figure 4:
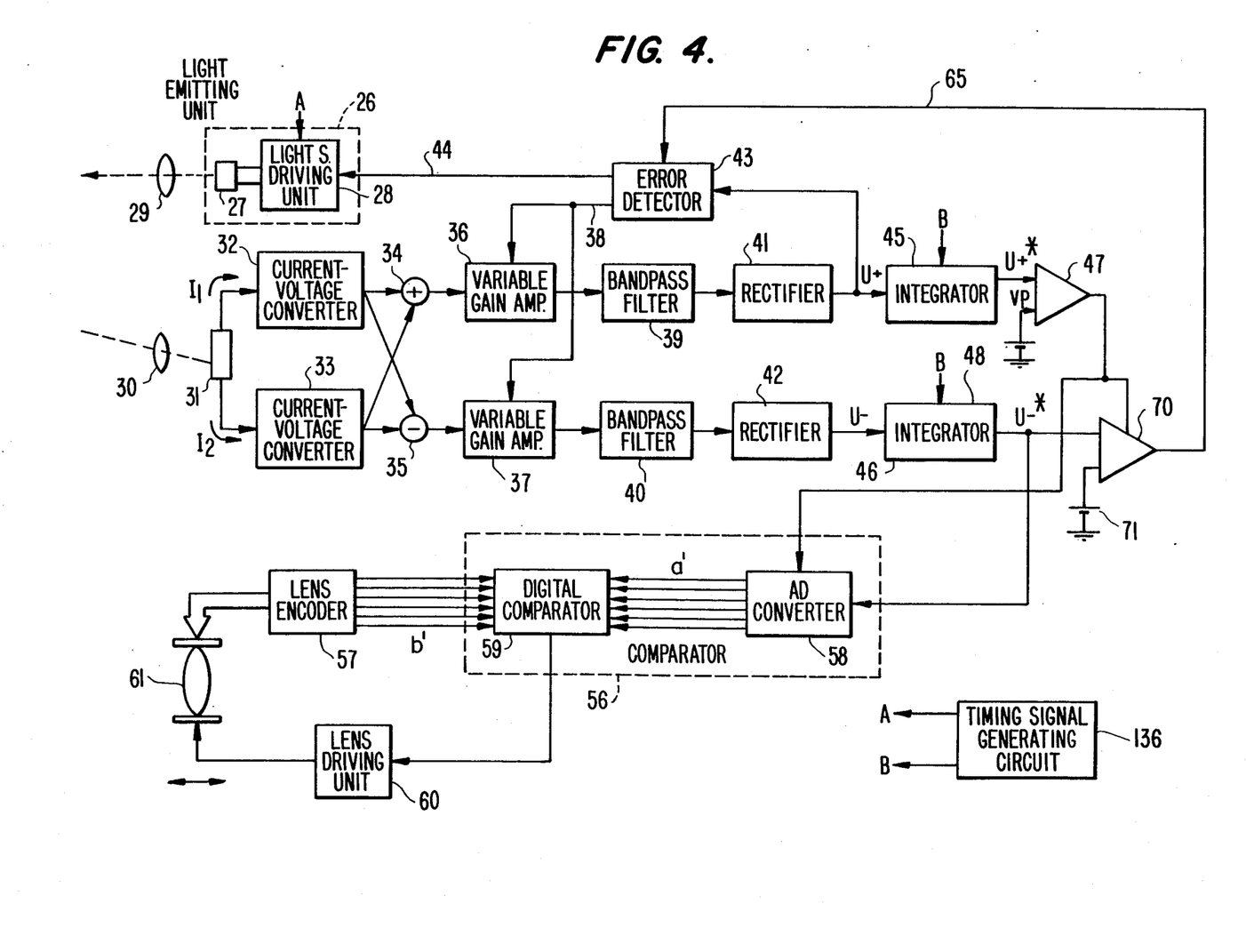
FIG. 4 is a block diagram of a preferred embodiment of the present invention.

Referring to FIG. 4, a light emitting unit 26 comprises a light source 27 and a light source driving unit 28. Upon the reception of a timing pulse A given thereto by a timing signal generating circuit 136, the light source driving unit 28 drives the light source 27 so that the light source 27 emits light intermittently at a fixed period. The light source driving unit 28 drives the light source 27 pulsatively at a frequency $f_s$. Since the timing signal generating circuit 136 is of a known constitution, description thereof will be omitted. In the following description, it is assumed that an infrared LED is employed as the light source 27. Infrared rays emitted from the infrared LED 27 is projected through a projecting lens 29 on an object, not shown. The reflected infrared rays reflected by the object is focused by a condenser lens 30 on a spot on the light receiving surface of an light-spot detector 31. First and second output currents $I_1$ and $I_2$ are converted into voltage signals by first and second current-to-voltage converters 32 and 33, respectively. Generally, the output currents $I_1$ and $I_2$ include, in addition to the component of the driving frequency $f_s$ of the infrared LED 27, DC components corresponding to the sunshine and artificial light and low-frequency components of 60 Hz, 120 Hz and the like corresponding to the artificial light. The first and second current-to-voltage converters are constituted so that the output thereof do not include the above-mentioned noise components. The output signals of the first and second current-to-voltage converters 32 and 33 are supplied to an adder 34 and a subtractor 35.

Figure 5:
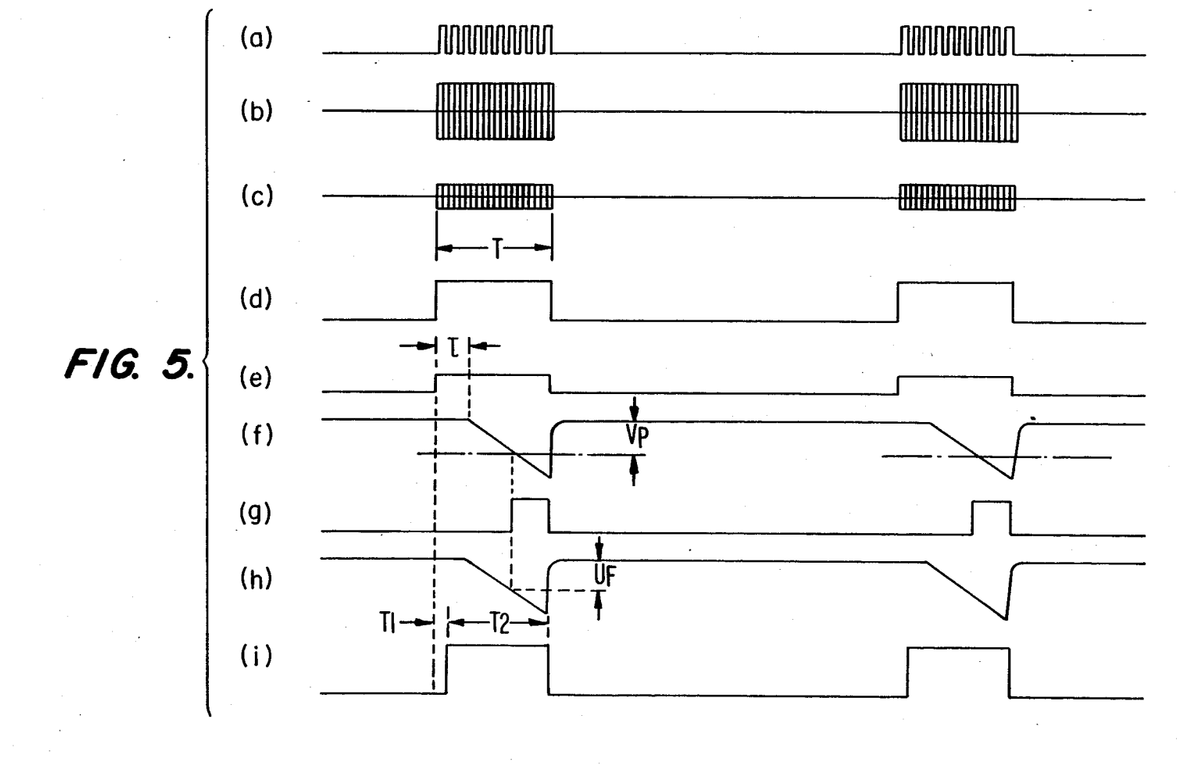
FIG. 5 is waveform charts of signals provided by the component units of the preferred embodiment of the present invention.
Figure 6:
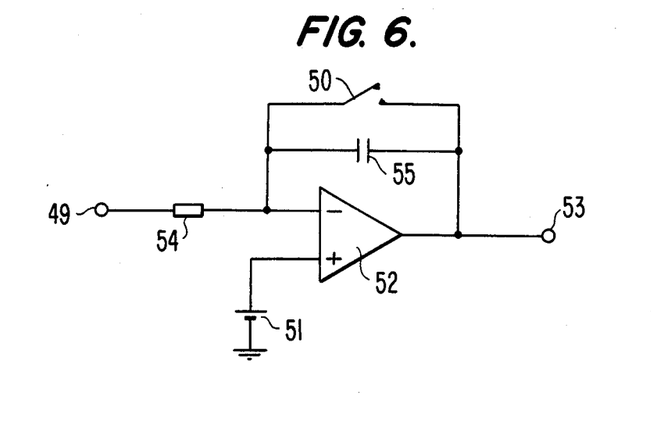
FIG. 6 is a circuit diagram of an integrating unit.

The adder 34 and the subtractor 35 provide output signals corresponding to $(I_1+I_2)$ and $(I_1-I_2)$, respectively. The output signals of the adder 34 and the subtractor 35 are supplied to first and second variable gain amplifiers 36 and 37, respectively, and their gains are regulated by a first control signal 38. The output signals of the first and second variable gain amplifiers 36 and 37 are supplied through first and second band-pass filters 39 and 40 to first and second rectifiers 41 and 42, respectively. The band-pass filters 39 and 40 amplify and pass only the frequency components within a narrow band including the driving frequency $f_s$ of the infrared LED to improve the SN (signal-to-noise) ratio. The first and second rectifiers 41 and 42 provide DC signals $U_+$ and $U_-$ corresponding to the amplitude of the output signals of the first and second band-pass filters, respectively. The output signal $U_+$ of the first rectifier 41 is supplied to an error detector 43. The error detector 43 provides the first control signal 38 for varying the gains of the first and second variable gain amplifiers, and a second control signal 44 for controlling the light source driving unit 28. Substantially, the luminous flux density of the infrared LED is regulated on the basis of the second control signal 44. The output signal $U_+$ of the first rectifier 41 is supplied to a first integrator 45. The first integrator 45 is constituted so that the DC signal $U_+$ is converted into a corresponding current signal and a capacitor is charged by the current signal and an integral $U_+^*$ which increases or decreases practically linearly with time is provided. A second integrator 46 receives the output signal $U_-$ of the second rectifier 42, converts the same into a corresponding current, charges a condenser by the current and provides an integral $U_-^*$ which increases or decreases practically linearly with time. FIGS. 5(a) to 5(i) show the waveforms of the signals provided by those components. FIGS. 5(a), 5(b), 5(c), 5(d) and 5(e) show the waveforms of the signals for driving the infrared LED 27: the output signal of the first current-to-voltage converter 32, the output signal of the second current-to-voltage converter 33, the output signal $U_+$ of the first rectifier 41 and the output signal $U_-$ of the second rectifier 42, respectively. A comparator 47 receives the output signal $U_+^*$ of the first integrator 45, compares the same with a reference voltage $V_P$ provided by a reference voltage source 48 and generates a pulse signal at a moment when $U_+^*=V_p$. FIG. 5(g) shows the waveform of the pulse signal $U_+^*$ generated by the comparator 47. In the above-mentioned signal processing operation, since $$U_+^* = C_1 \cdot (I_1+I_2) \cdot t \quad (4)$$
$$U_-^* = C_2 \cdot (I_1-I_2) \cdot t \quad (5)$$

where $C_1$ and $C_2$ are constants and t is the time of integration, and if the value of $U_-^*$ at a moment when $U_+^*=V_p$ (this value is designated by "$U_F$" hereinafter) is always detected, $U_F$ is proportional to a value $(I_1-I_2)/(I_1+I_2)$. Owing to the characteristics of the light-spot detector, the value of $(I_1-I_2)/(I_1+I_2)$ is proportional to the reciprocal of the distance L from the light-spot detector to the object. Therefore, $U_F \alpha 1/L$. Thus the (video) camera can be focused by the use of $U_F$. FIG. 5(h) shows the waveform of $U_-^*$. $U_F$ is the amplitude of $U_-^*$ at the leading edge of the output pulse signal of the comparator 47. In order to obtain $U_F$ from $U_-^*$, the output pulse signal of the comparator 47 is applied to an AD (analog-to-digital) converter 58, the AD converter 58 reads the level of $U_-^*$ at the leading edge of the output pulse signal and regulates the timing for AD conversion. FIG. 6 shows a concrete circuit constitution of the first and second integrators 45 and 46. The output signal $U_+^*$ of the first rectifier 41 is applied to an input terminal 49. A switch 50 is controlled by a timing pulse signal B given thereto by a timing signal generating circuit 136 so as to be closed while the infrared LED does not emit infrared rays and to be opened a fixed time $\tau$ after the start of emitting infrared rays while the infrared LED emits infrared rays. Since the switch 50 is closed while the infrared LED does not emit infrared rays, a reference voltage 51 applied to the non-inverting input terminal of an operational amplifier appears without change at an output terminal 53. On the contrary, while the infrared LED emit infrared rays, the switch 50 is opened and a capacitor 55 is charged by a fixed current corresponding to the quotient of the voltage difference between the voltage applied to the input terminal 49 and the reference voltage 51 divided by the resistance of a resistor 54. The timing for opening the closed switch 50 is delayed by the fixed time $\tau$ as shown in FIG. 5(f) to skip the transient response time of the leading edges of the signals $U_+$ and $U_-$. The output signal $U_F$ is supplied to a comparator 56. On the other hand, a lens encoder 57 detects the focusing position of the picture taking lens and provides a 6-bit position signal b′ corresponding to a position in sixty-fourth of a range from the nearest object distance to the infinite object distance. The 6-bit position signal b′ is given to the comparator 56. The comparator 56 consists of an AD (analog-to-digital) converter 58 and a digital comparator 59. The AD converter 58 converts the value of $U_-^*$ at the leading edge of the output pulse signal of the comparator 47, namely, $U_F$, into a corresponding 6-bit digital signal a′. The digital comparator 49 compares the digital signal a′ and the position signal b′. A lens driving unit 60 receives the output signal of the digital comparator 59 and adjust the picture taking lens 61 so that a′=b′ and stops the picture taking lens 61 at an optimum focusing position to complete the automatic focusing procedure.

Figure 7:
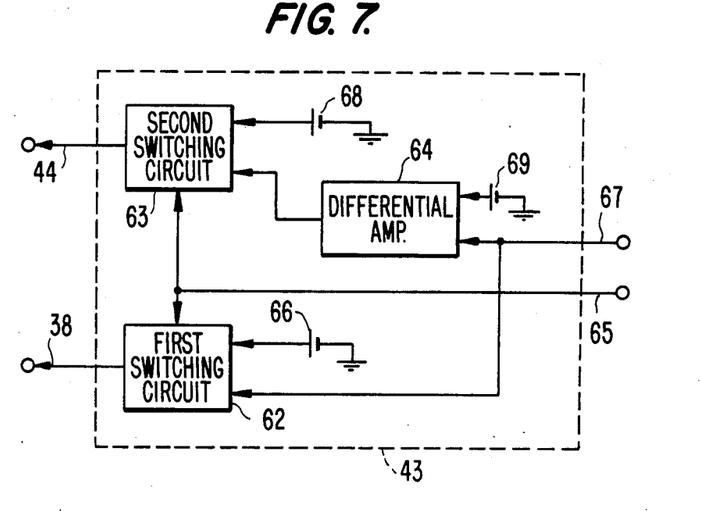
FIGS. 7 and 8 are a block diagram and a circuit diagram of an error detecting unit, respectively.

FIG. 7 shows the constitution of the error detector 43. The error detector 43 comprises first and second switching circuits 62 and 63 and a differential amplifier 64. The first switching circuit 62 functions according to a switching signal 65 having two signal modes, namely, a high level mode and a low level mode, to provide a reference voltage signal provided by a first reference voltage source 66 or the output signal $U_+$ 67 of the first rectifier 41. The output signal of the first switching circuit is the first control signal 38. When the first control signal 38 is a fixed reference voltage signal, the first and second variable amplifiers 36 and 37 function at a fixed gain. When the first control signal 38 is the output signal $U_+$ of the first rectifier 41, the first variable gain amplifier 36, the first band-pass filter 39, the first rectifier 41 and the error detector 43 constitute a closed loop, which functions as a negative feedback loop which automatically controls the gain of the first variable gain amplifier 36 so that the output signal $U_+$ of the first rectifier 41 is always a fixed value even if the input signal of the first variable gain amplifier 36 is variable. At the same time, the gain of the second variable gain amplifier 37 is controlled similarly by the first control signal, and hence the level of the output signal $U_-$ of the second rectifier 42 is controlled according to the amplitude of the output signal $U_+$. On the other hand, the second switching circuit 63 functions according to the switching signal 65 to provide a reference voltage provided by a third reference voltage source 68 or the output signal of the differential amplifier 64. The differential amplifier 64 amplifies the difference between the output signal $U_+$ 67 of the first rectifier 41 and the reference voltage provided by a second reference voltage source 69. The output signal of the second switching circuit 63 is the second control signal. When the second control signal 44 corresponds to the output signal of the differential amplifier 64, the light source driving unit 28, the infrared LED 27, the light-spot detector 31, the first and second current-to-voltage converters 32 and 33, the adder 34, the first variable gain amplifier 36, the first band-pass filter 39, the first rectifier 41 and the error detector 43 constitute a closed negative feedback loop which provides an automatic luminous flux density regulating function to control the luminous flux density of the infrared LED according to the output signal $U_+$ of the first rectifier 41 so that the value of $U_+$ is always fixed. When the second control signal 44 is a fixed voltage, the luminous flux density of the infrared LED is equal to a predetermined maximum luminous flux density.

These automatic regulating functions need to be carried out orderly taking into considerations the actual operation of the video camera under conditions securing stable operation of the circuits. FIG. 5(i) shows the waveform of the switching signal. In a period T in which the infrared LED emits infrared rays (FIG. 5(b)), mainly, the automatic luminous flux density regulation is implemented during the initial period $T_1$ and the mode of the error detector 43 is changed so that automatic gain regulation is not implemented. Then, during a light emitting period $T_2$, the infrared LED continue emitting infrared rays at a fixed luminous flux density determined by automatic luminous flux density regulation during the period $T_1$, the automatic gain regulation is implemented and the amplitude is regulated so that the output signal $U_+$ of the first rectifier 41 will coincide with a fixed value. As explained hereinbefore, the time of starting the integrating operation of the integrators 45 and 46 needs to be delayed by the time $\tau$ to avoid the integrating operation overlapping the transient response duration of the automatic luminous flux density regulation and the automatic gain control. The automatic focusing system of the present invention is capable of bringing the picture taking lens to focus by completing distance measurement through a single emission cycle. Accordingly, the basic period of the repetition of light emission can comparatively freely be determined. When distance measurement is repeated at a frequency of several hertz in consideration of accessibility, practically satisfactorily stable automatic regulation and switching are possible.

Figure 8:
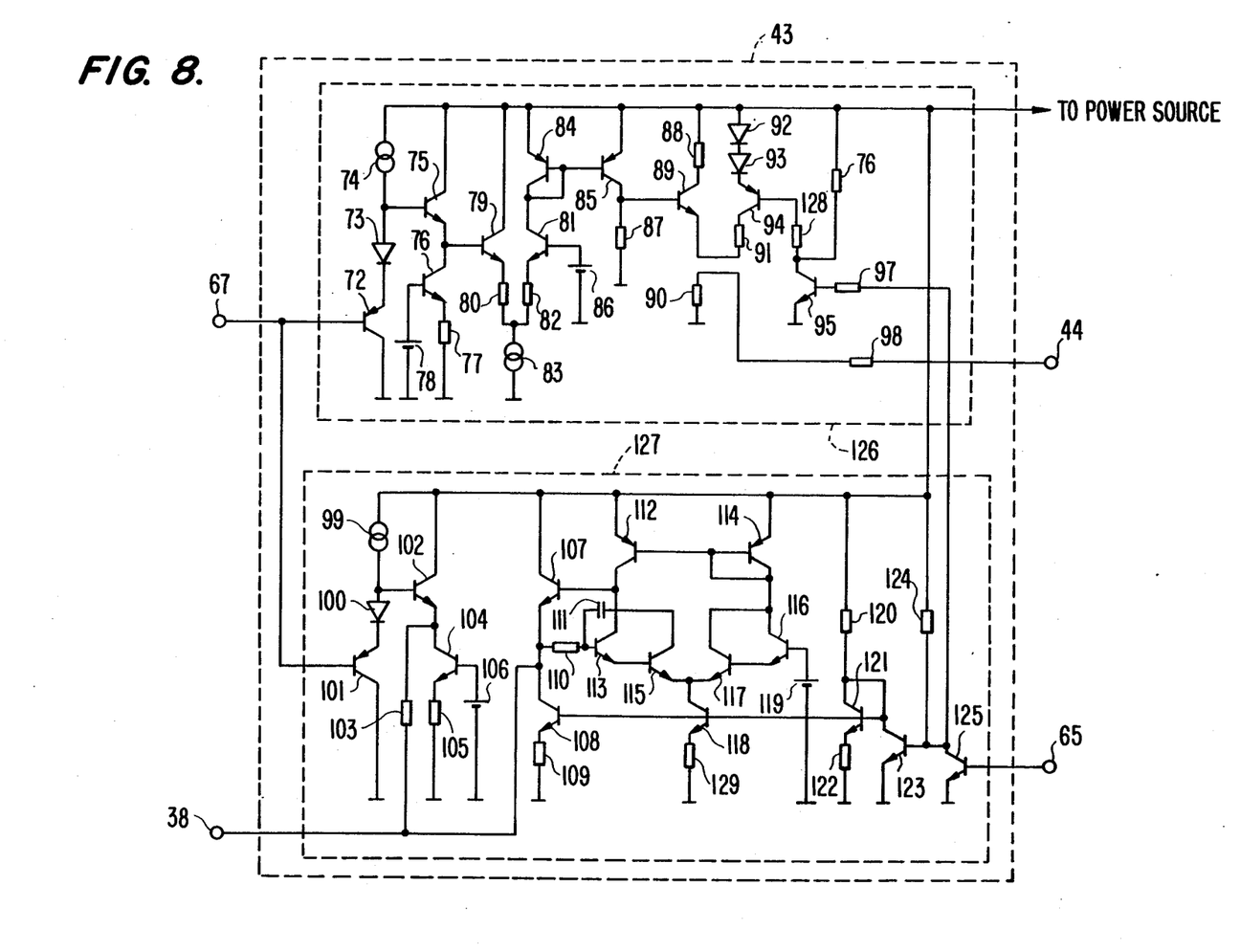

FIG. 8 shows a concrete circuit constitution of the error detector. Only the principal functions of the error detector will be described. A block 127 enclosed by broken lines corresponds to the first switching circuit and the first reference voltage source of FIG. 7. When the switching signal 65 is at the low level L, a transistor 125 is switched off, while the transistor 123 is switched on. Consequently, the potentials of the base terminals of transistors 108, 118 and 121 drop and the transistor 108 does not function. Accordingly, the output signal $U_+$ 67 of the first rectifer 41 is provided as the first control signal 38 through a transistor 101, a diode 100, a transistor 102 and a resistor 103. When the switching signal 65 is at the high level H, the transistor 125 is switched on, while the transistor 123 is switched off. In this state, a reference voltage practically the same as the voltage of a reference power source 119 is generated at the collector of the transistor 108, and the reference voltage is provided as the first control signal. In FIG. 8, a block 126 enclosed by broken lines corresponds to the second switching circuit 63, the differential amplifier 64, the second reference voltage source 69 and the third reference voltage source 68 of FIG. 7. When the switching signal is at the low level L, a transistor 95 is switched on and the base potential of a transistor 94 drops. Consequently, a current is supplied through diodes 92 and 93, a transistor 94 and resistors 91 and 90 from the power source. Accordingly, a fixed DC voltage determined by the current and the resistance 90 is provided as the second control signal 44. When the switching signal is at the high level H, the transistors 94 and 95 are switched off. Consequently, the output signal $U_+$ 67 of the first rectifier 41 is applied through a transistor 72, a diode 73 and a transistor 75 to the base terminal of a transistor 79 of the differential amplifier. The base terminal of the other transistor 81 of the differential amplifier is connected to a second reference voltage source 86. The difference between the output signal $U_+$ 67 of the first rectifier 41 and the voltage of the second reference voltage source is produced by a current mirror circuit at the collector terminal of a transistor 85 and the difference is provided through a transistor 89 and a resistor 98 as the second control signal. As apparent from FIG. 4, in this embodiment, the switching signal 65 is obtained by comparing the output signal $U_-^*$ of the second integrator 46 and the fixed voltage provided by the reference voltage source 71 by the comparator 70 at the leading edge of the output pulse signal of the comparator 47. To accomplish this, the output pulse signal of the comparator 47 is supplied also to the comparator 70. The value of the output $U_-^*$ of the second integrator 46 at a time when $U_+^* = V_P$ represents the subject distance. Thus, the switching signal 65 is generated on the basis of a decision as to whether or not the subject distance is greater than a predetermined fixed value.

The switching signal 65 may be obtained on the basis of the result of comparison of the position signal b' provided by the lens encoder 57 with a predetermined reference value.

Figure 9:
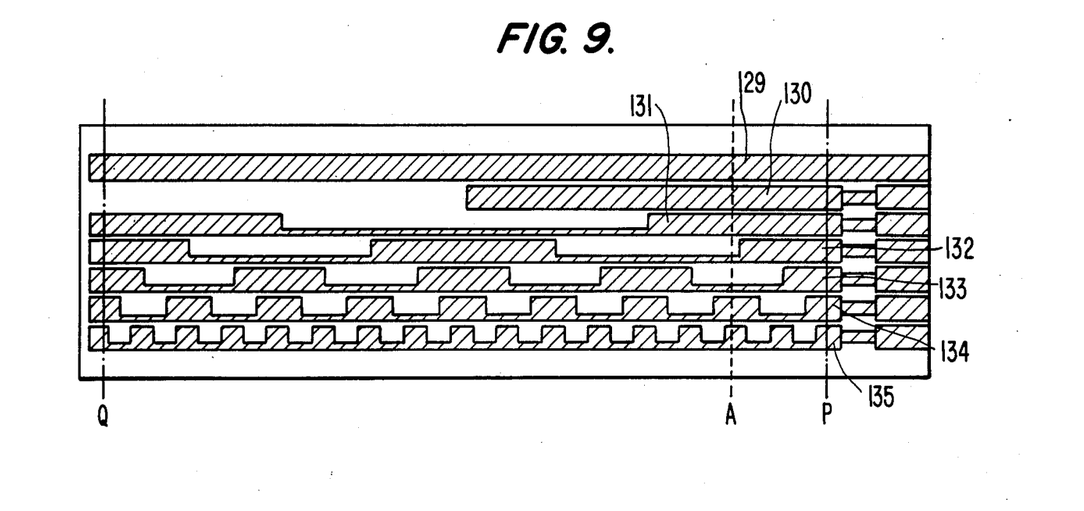
FIG. 9 is a typical illustration of an exemplary pattern of a lens encoder.

The lens encoder 57 employed in this embodiment is such an encoder capable of detecting the angle of turning of the helicoid mechanism incorporated in the focusing lens group of the picture taking lens. A thin film carrying encoding patterns as shown in FIG. 9 is applied to the outer circumference of the focusing lens group. In FIG. 9, shaded portions are conductive portions, while blank portions are insulating portions. A first pattern 129 is a common conductor. When the focusing lens group is turned for focusing by the helicoid mechanism, seven conductive sliders, not shown, move along the encoding patterns, respectively. Then, currents flow intermittently between the first pattern 129 and the other patterns 130 to 135 to generate the position signal b'. For example, when the seven conductive sliders stop at a position A indicated by a broken line, currents flow only between the first pattern 129 and the second, third, sixth and seventh patterns 130, 131, 134 and 135. Therefore, the position signal b' = 001100. Thus the entire range of movement of the focusing lens group between a position P=000000 corresponding to the nearest range and a position Q=100000 corresponding to the infinite range indicated by alternate long and short dash lines in FIG. 9 is divided in sixty-fourth and each division is allocated to a gray code.

In the embodiment shown in FIG. 4, the variable gain amplifier 36 and the band-pass filter 39, and the variable gain amplifier 37 and the band-pass filter 40 may be interchanged, respectively, for practically the same functions. Furthermore, in the foregoing description, it is assumed that the lens encoder 57, the AD converters 58 and the others process 6-bit digital signals, however, the number of bits of the signals is not limited thereto, but the number of bits may be increased or reduced, as occasion demands. Still further, in the embodiment described hereinbefore, infrared rays for distance measurement is projected through a projecting lens 29, however, it is also possible to achieve the same automatic focusing by projecting infrared rays by means of the picture taking lens or some of the lens group of the picture taking lens and an optical system which reflects or refracts infrared rays.

What is claimed is:

1. An automatic focusing system for a camera, comprising: a light emitting unit which emits a distance measuring light beam; a condenser lens which condenses the reflective light among the light beam projected from the light emitting unit and reflected by an object; a light-spot detector disposed at the focal point of the condenser lens and capable of producing first and second photoelectric currents according to the position of the focused spot of said reflective light on the light receiving surface thereof and providing output signals corresponding to the first and second photoelectric currents, respectively; an arithmetic unit which processes the output signals of said light-spot detector through addition and subtraction; a first variable gain amplifier which amplifies an output signal of said arithmetic unit corresponding to the sum of the output signals of said light-spot detector in response to a first control signal; a second variable gain amplifier which amplifies an output signal of said arithmetic unit corresponding to the difference between the output signals of said light-spot detector in response to the first control signal; first and second rectifying units which rectify the output signals of said first and second variable gain amplifiers, respectively; first and second integrators which receives the output signals of said first and second rectifying units, respectively, and provide integrated voltage signals corresponding to the output signals of said first and second rectifying units, respectively; a level decision unit which detects the level of the output signal of said first integrator; a lens encoder which detects the existing focusing position of a picture taking lens; a comparator which compares the output signal of said second integrator and an output signal of said lens encoder; a lens driving unit which drives the picture taking lens according to the output signal of said comparator to an optimum focusing position; an error detector which receives a switching signal and said output signal of said first rectifying unit, and produces a second control signal for controlling the luminous flux density of said light emitting unit and said first control signal for controlling the respective gains of said first and second variable gain amplifiers, wherein the picture taking lens is driven by said lens driving unit so as to be stopped at an optimum focusing position until the output of said lens encoder coincides with a value corresponding to an output signal of said second integrator at a moment when said level decision unit decides that the output of said first integrator is equal to a fixed value.

2. An automatic focusing system for a camera, according to claim 1, wherein said error detector comprises a first switching circuit which receives the output signal of said first rectifying unit and a first reference voltage signal given thereto by a first reference voltage source, changes over between the output signal of said first rectifying unit and the first reference voltage signal according to said switching signal, and provides either one of said both signals, or a signal corresponding to the sum of said both signals as said first control signal; a differential amplifier which receives the output signal of said first rectifying unit and a second reference voltage signal given thereto by a second reference voltage source, and amplifies the difference between the output signal of said first rectifying unit and the second reference voltage signal; and a second switching circuit which receives the output signal of said differential amplifier and a third reference voltage signal given thereto by a third reference voltage source, changes over between the output signal of said differential amplifier and said third reference voltage signal according to said switching signal, and provides either said output signal of said differential amplifier of said third reference voltage signal as said second control signal.

3. An automatic focusing system for a camera, according to claim 1, wherein said switching signal is an output signal of said lens encoder.

4. An automatic focusing system for a camera, according to claim 1, wherein said switching signal is based on the result of comparison between the output of said second integrator at a moment when a decision is made by said level decision unit that the output signal of the first integrator is equal to a fixed value and a fourth reference voltage signal provided by a fourth reference voltage source.

5. An automatic focusing system for a camera, according to claim 4, wherein the output signal of the second integrator and the output signal of the fourth reference voltage source are given to a first comparator, and an output of said first comparator provided at a moment when the output signal of the first integrator coincides with a fixed value is used as the switching signal.

6. An automatic focusing system for a camera, according to claim 1, wherein said light emitting unit comprises a light source which emits a distance measuring light beam, and a light source driving unit for driving said light source.

7. An automatic focusing system for a camera, according to claim 6, wherein said light source emits a distance measuring infrared beam.

8. An automatic focusing system for a camera, according to claim 7, wherein said light source is an infrared light emitting diode.

9. An automatic focusing system for a camera, according to claim 6, wherein said light source driving unit regulates the luminous flux density of the light source at a fixed frequency through luminous flux density modulation.

10. An automatic focusing system for a camera, according to claim 1, wherein said arithmetic unit comprises first and second current-to-voltage converters for converting the first and second photoelectric currents provided by said optical position detector into corresponding first and second voltage signals, respectively; an adder which adds the respective output signals of said first and second current-to-voltage converters; and a subtractor which processes the respective output signals of said first and second current-to-voltage converters through subtraction.

11. An automatic focusing system for a camera, according to claim 1, wherein said first and second rectifying units comprise first and second frequency selective amplifiers which receive the output signals of said first and second variable gain amplifiers, and first and second rectifiers which receive the output signals of said first and second frequency selective amplifiers, respectively.

12. An automatic focusing system for a camera, according to claim 11, wherein said first and second frequency selective amplifiers are band-pass filters.

13. An automatic focusing system for a camera, according to claim 11, wherein said first and second frequency selective amplifiers are high-pass filters.

14. An automatic focusing system for a camera, according to claim 11, wherein said first and second rectifiers are synchronous rectifiers.

15. An automatic focusing system for a camera, according to claim 1, wherein said first and second integrators charge capacitors with fixed currents of intensities corresponding to the amplitudes of the output signals of said first and second rectifying units, respectively, and provides voltage signals which increase or decrease practically linearly, respectively.

16. An automatic focusing system for a camera, according to claim 1, wherein said level decision unit comprises the second comparator and a fifth reference voltage source; said second comparator receives the output signal of said first integrator and a fifth reference voltage signal provided by said fifth reference voltage source; and said second comparator compares the levels of the output signal of said first integrator and the fifth reference voltage signal.

17. An automatic focusing system for a camera, according to claim 1, wherein said lens encoder has a range correspondng to the range of focusing positions of the taking lens corresponding to a range from the nearest range to the infinite range and divided into divisions of the predetermined plural number, and provides a digital signal of a bit number decided in accordance with the number of the divisions.

18. An automatic focusing system for a camera, according to claim 17, wherein said lens encoder has a range corresponding to the range of the angle of turning of a helical incorporated in the focusing lens group of the taking lens, corresponding to a range from the nearest range to the infinite range and divided into divisions of the predetermined plural number, and provides a digital signal of a bit number decided in accordance with the number of the divisions.

19. An automatic focusing system for a camera, according to claim 1, wherein said comparator comprises an analog-to-digital converter which divides the range of the voltage signals provided by the second integrator, corresponding to a range from the nearest range to the infinite range, into divisions of the same number as that of said lens encoder (the same bit number); and a digital comparator for the digital comparison of the output signal of said analog-to-digital converter and the output signal of said lens encoder for every corresponding bit.

* * * * *

UNITED STATES PATENT AND TRADEMARK OFFICE
CERTIFICATE OF CORRECTION

PATENT NO. : 4,673,274

DATED : June 16, 1987

INVENTOR(S) : Yoshitomi NAGAOKA et al.

Page 1 of 2

It is certified that error appears in the above-identified patent and that said Letters Patent is hereby corrected as shown below:

Column 4, line 12, change "IC" to --AC--.

Please correct Fig. 8 per the attached sheet of drawings.

Signed and Sealed this

Sixteenth Day of February, 1988

Attest:

DONALD J. QUIGG

Attesting Officer

Commissioner of Patents and Trademarks

FIG. 8.